(12) United States Patent
Mulcahy et al.

(10) Patent No.: US 9,497,246 B2
(45) Date of Patent: *Nov. 15, 2016

(54) BONDING OF MULTIPLE CONCURRENT DATA STREAMS AMONG MULTIPLE DEVICES

(71) Applicant: Bandwidth.com, Inc., Raleigh, NC (US)

(72) Inventors: James Mulcahy, Raleigh, NC (US); Sai Rathnam, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,088

(22) Filed: Aug. 31, 2015

(65) Prior Publication Data

US 2015/0381691 A1 Dec. 31, 2015

Related U.S. Application Data

(60) Provisional application No. 62/205,950, filed on Aug. 17, 2015, provisional application No. 62/158,858, filed on May 8, 2015.

(51) Int. Cl.
| | |
|---|---|
| G06F 15/16 | (2006.01) |
| H04L 29/06 | (2006.01) |
| H04L 29/08 | (2006.01) |
| H04L 12/801 | (2013.01) |

(52) U.S. Cl.
CPC ............ *H04L 65/608* (2013.01); *H04L 47/14* (2013.01); *H04L 65/4015* (2013.01); *H04L 65/80* (2013.01); *H04L 67/10* (2013.01)

(58) Field of Classification Search
CPC ............... H04L 47/14; H04L 61/2007; H04L 65/4015; H04L 65/608; H04L 12/66; H04L 25/14

See application file for complete search history.

(56) References Cited

U.S. PATENT DOCUMENTS

| | | | |
|---|---|---|---|
| 8,675,476 B2 | 3/2014 | Brownworth et al. | |
| 8,971,205 B2 | 3/2015 | Brownworth et al. | |
| 9,014,038 B2 | 4/2015 | Brownworth et al. | |
| 2010/0271944 A1* | 10/2010 | Michaelis | H04L 45/24 370/230.1 |
| 2011/0051735 A1* | 3/2011 | Matthews | H04L 45/00 370/400 |
| 2013/0170471 A1* | 7/2013 | Nix | H04W 36/00 370/331 |
| 2014/0355446 A1* | 12/2014 | Altman | H04W 28/0289 370/235 |
| 2015/0020135 A1* | 1/2015 | Frusina | H04N 21/4621 725/116 |

* cited by examiner

*Primary Examiner* — Djenane Bayard
(74) *Attorney, Agent, or Firm* — Gregory Stephens

(57) ABSTRACT

Examples are disclosed for hosting a communication session between a computer device and a destination communication device in an Internet Protocol (IP) based packet data network. A computer device receives multiple concurrent IP packet data streams each representative of the same content but received over corresponding multiple communication links. The original IP packet data stream comes from the communications server. At least one IP packet data stream representative of the original IP packet data stream traverses a communication link through a second communication device working in tandem with the communications server before arriving at the computer device. The computer device determines a highest quality packet for each corresponding packet in the multiple concurrent IP packet data streams. The computer device then creates a bonded IP packet data stream by selecting the highest quality packet for each time slot from among corresponding time slots of the multiple concurrent IP packet data streams.

22 Claims, 6 Drawing Sheets

500

600

BONDING OF MULTIPLE CONCURRENT DATA STREAMS AMONG MULTIPLE DEVICES

CROSS-REFERENCE TO RELATED APPLICATIONS

This application is claims priority to and the benefit of U.S. Prov. App. 62/158,858 filed May 8, 2015 entitled "Optimal Use of Multiple IP Streams for Voice Communications" and U.S. Prov. App. 62/205,950 filed Aug. 17, 2015 entitled "Bonding Of Multiple Concurrent Data Streams Among Multiple Devices".

TECHNICAL FIELD

Examples described herein are generally related to techniques for managing concurrent Internet Protocol (IP) data streams among multiple devices for voice, video, and data communications.

BACKGROUND

Most Internet Protocol (IP) network enabled computer devices are capable of sending and receiving IP data packets over one or more networks to other network enabled computer devices. Such computer devices may include, but are not limited to, desktop computers, laptop or notebook computers, tablet computers, and smartphones. In the area of communications, there are packet based protocols for streaming data, voice, and video using proprietary and/or standards based software. One such commercial example of a proprietary example is Skype™. A Skype™ user may communicate with other Skype™ users (and in some scenarios non-Skype™ users) by streaming IP data packets through a communications server to one or more other endpoints also communicable with the communications server.

This configuration works well enough when the endpoint(s) have good network connectivity with the communications server to which they can reliably send and receive the IP data packets. Often, however, the IP data packet stream may be interrupted or otherwise compromised resulting in garbled voice communication and/or inconsistent video communication due to jitter, latency, packet loss, etc. There is currently no mechanism available to the user to create a secondary or redundant concurrent IP data packet stream with the assistance of a second device over the same or a different communication link (or both) to the server. If such a mechanism were available to the user, the overall quality of the communication session between the endpoint and the communications server could be significantly enhanced using some packet stream bonding techniques.

The embodiments described herein offer such a mechanism of creating multiple concurrent (redundant) IP data packet streams using a secondary device that may be used to supplement the main IP data packet stream.

DETAILED DESCRIPTION

Figure 1:
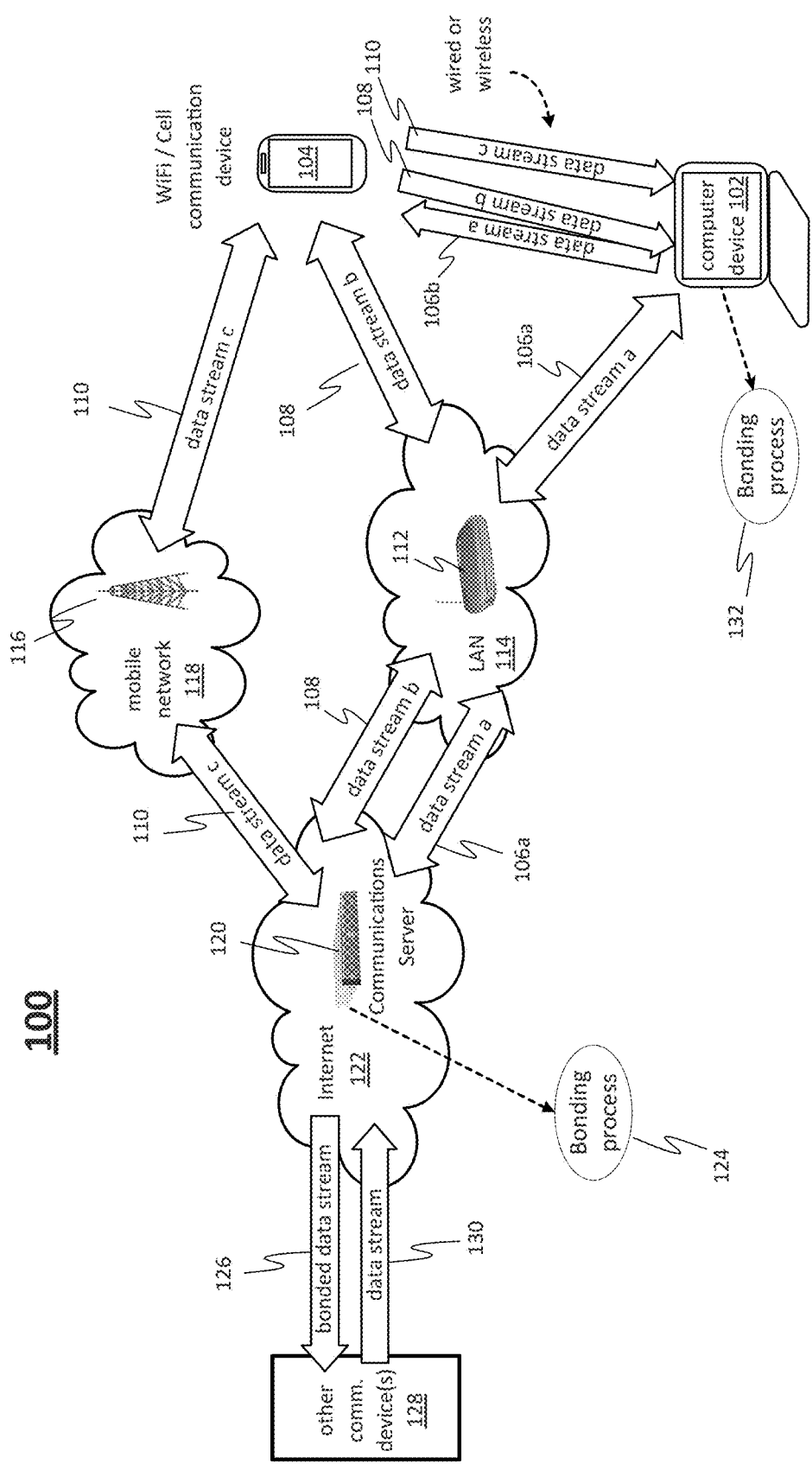
FIG. 1 illustrates an example block diagram for a networked environment.

The embodiments described herein disclose systems and methods for intelligently managing multiple concurrent IP packet data streams between a hybrid mobile device and a network based communications server to enhance communication sessions between or among communication devices. The systems and methods of the invention may be embodied in and performed by communication devices, network based communications server and other devices, and software instructions executed by some or all of such devices, as will be explained in detail below. The different types of networks contemplated herein include, for example, cellular mobile networks both circuit switched and IP based, and data networks, such as the Internet or other IP-based networks, including wide area networks, local area networks, and combinations thereof both wireless (e.g., 802.11) and wireline (e.g., Ethernet).

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "mobile device" is meant to include a mobile device capable of communicating wirelessly over at least two interfaces (802.11 WiFi and a cellular IP based interface—e.g., LTE) an often a third wireless interface (Bluetooth). As used herein, the term "computer device" or "endpoint" is meant to include a computer device capable of communicating wirelessly over at least an 802.11 WiFi and often another short range wireless interface such as Bluetooth. A mobile device, computer device, and endpoint may also be referred to as a communications device. As used herein, the term "communication link" is intended to mean a physical and/or logical channel that connects two or more mobile devices, computer devices, or endpoints with a cloud based communications server.

A communication link between two devices does not necessarily involve the communications server. A communication link may also be between two devices on a peer to peer basis over a wireline connection (e.g., a data cable) or a short range wireless connection such as Bluetooth. A communication link may be a signaling link or a media link. In this context, a communication session may be established via one or more communication links in which a network based communications server may be an endpoint for each of the communication links. The network based communications server may then join one or more communication links together to establish a communication session between or among two or more devices. One or more IP data media streams may be transmitted by a single mobile device or endpoint over one or more communication links. A network based communications server may be situated between communication devices thereby making the network based communications server an endpoint in a communication link. The network based communications server may be hosted within an IP network such as, for instance, the Internet or a LAN/WAN accessible to the Internet. In addition to the foregoing, two communication devices may also operate in tandem to communicate with the communications server as will be described below.

Moreover, many communication devices are capable of utilizing multiple different networks simultaneously and independently. For instance, these communication devices include the ability to transmit and receive IP packet data on an IP based network over an 802.11 wireless fidelity (WiFi) connection as well as a cellular IP data network. Other IP based networks operating using different protocols than 802.11 or cellular IP (e.g., LTE) may also be implemented into the embodiments described herein.

Therefore, references herein to a computer device, mobile device, endpoint, or communication device capable of connecting to or communicating via a mobile carrier network refer to a communication device equipped with a cellular transceiver for wireless communication with base stations and other mobile carrier network access points for purposes of accessing circuit switched voice services and/or cellular IP data services. Similarly, references herein to a computer device, mobile device, endpoint, or communication device capable of connecting to or communicating via an IP data network refer to a communication device equipped with a transceiver or other network interface for wireless communication (e.g., 802.11 WiFi) with a router or other IP data network access point.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 122, one or more IP based local area networks or wide area networks (LAN/WAN) 114 including an 802.11 wireless router 112 and a mobile carrier network (e.g., cellular network) 118 including a basestation tower 116 for interfacing with cellular enabled devices.

Other alternative IP based networks and access points (not shown) may be implemented and utilized in such a networked environment to further supplement and/or add to the number and diversity of communication links between endpoints 102, 104, 128 and a communications server 120.

Such alternative networks may include wireless networks that do not utilize the same protocols and/or operate over the frequency spectrum typically associated with 802.11 (e.g., 2.4 GHz and 5.8 GHz WiFi) or today's cellular (e.g., 800 MHz-1900 GHz). One example of such an alternate wireless network may be WiMAX (e.g., 802.16). Other examples may include, but are not limited to, television whitespace network frequencies and other unlicensed (or yet to be licensed) frequencies. These may include, for example, a wireless network operating within a frequency range of 700 MHz or less, and a wireless network operating a frequency range of 3.5 GHz and 3.7 GHz.

While these distinct networks may utilize different protocols and signaling schemes, there are various interfaces that allow for the seamless transition of voice and data (including text, audio, and video) such that various communication endpoints may communicate with one another over one or more of these inter-connected networks.

A mobile carrier network 118 (sometimes referred to as a cellular network) may come in different varieties based on the circuit switched radio frequency (RF) transmission scheme between a communication device 104 known as a wireless handset (e.g., mobile, cellular, or hybrid phone) and the mobile carrier network basestation 116 that is in communication with the communication device 104. Two such circuit switched RF transmission schemes are the Global System for Mobile Communication (GSM) and Code Division Multiple Access (CDMA). These circuit switched RF transmission schemes are incompatible with one another necessitating an intervening interface to allow communication between communication devices 104 on either network. In addition, each network may operate over specific frequency ranges. Often, there may even be an intervening network such as the Public Switched Telephone Network (PSTN) (not shown) between two distinct mobile carrier networks. Each mobile carrier network 118 may include an interface to the PSTN (not shown) such that calls crossing that interface can be handled by the receiving network whether it is a mobile carrier network 118 or the PSTN.

Various mobile carrier network operators base their network 118 on one of the circuit switched RF transmission schemes and provide circuit switched service to communication devices 104 using that RF transmission scheme over a defined frequency band. For example, a communication device 104 may wirelessly communicate with a basestation 116 that serves as an access network to the circuit switched portion of the mobile carrier network 118. The basestation 116 authenticates and authorizes the communication device 104 to the mobile carrier network 118 and, in conjunction with other equipment within the mobile carrier network 118, can manage circuit switched calls to and from the communication device 104. The mobile carrier network 118 provides connectivity for any communication device 104 capable of cellular transmission that are physically located within range of the mobile carrier network 118. The range of a mobile carrier network 118 may depend in part on an amplification, power, and/or energy associated with the antennas comprising cellular basestation 116, communication device 104 and the like. As the communication device 104 moves toward the outer range of the mobile carrier network 118, the strength of the cellular signals degrade.

The same applies when accessing the mobile carrier network's 118 cellular IP data services. Once authenticated, the communication device 104 may utilize an IP protocol over the cellular connection to exchange IP data with other devices coupled to the Internet 122 including routers and servers along the path of an IP data packet stream as well as a communications server 120.

Similarly, an IP based data network like the a LAN 114 or Internet 122 may provide wireless connectivity to communication device 104 or other devices within range of an IP access point 112. For instance, an IP access point 112 may provide wireless connectivity to the Internet 122 via a LAN 114 using any of the 802.11 WiFi standards and/or any other type of IP based connectivity standard. As will be appreciated by those of skill in the art, a communication device 104 may experience a stronger connection signal when located closer to an IP access point 112 than when located further away from the IP access point 112. Thus, the strength of the wireless data connection may fade as the communication device 104 moves away from an IP access point 112.

The collection of IP based data networks illustrated in FIG. 1 such as LAN/WANs 114, cellular data networks 118, alternative wireless networks (not shown), and the Internet 122 may all run on a packet based data transfer protocol (e.g., IP) characterized as packet switching. Packet switching essentially chops up the data to be sent (e.g., text, voice, data) into a stream of packets and transfers the packet stream across an IP network to a destination where the packets are re-assembled into the original data. Voice over IP (VoIP) is a specialized subset of IP packet based communication directed to IP telephony. A communication device 104 may utilize an IP access point 112 to access a local IP network 114 that in turn may access a larger IP network like the Internet 122. The IP access point 112 may be wired, wireless (e.g., 802.11 WiFi), or a combination wired/wireless access point such as those illustrated in FIG. 1. A VoIP enabled communication device 104 may communicate with an IP access point 112 to gain access to the larger IP network 122 and, eventually, other communication devices 128.

In addition to VoIP, the communication devices 104 and computer device(s) 102 may utilize IP standards to send and receive video data under one or more video codecs.

In certain embodiments, mobile carrier network(s) 118 include cellular networks or portions of cellular networks based on a variety of IP data protocols such as, but not limited to, General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other cellular network standards.

IP based data networks 114 and 118 (cellular data portion) include, for example, the Internet 122, one or more intranets, wide area networks (WANs), local area networks (LANs) 114, and the like, portions or all of which may be wireless and/or wired. For instance, an IP based data network 114, 118 (cellular data portion) may be a wireless network or a portion of a wireless network implemented using an 802.11 standard such as WiFi, an 802.16 standard such as WiMAX, a cellular IP protocol (e.g., LTE) and/or any other wireless data communication standard. As is known in the art, communication devices 104 via the various networks 112, 118, 122 may interface with a communications server 120 through gateway devices, routers and/or other appropriate devices (not shown).

FIG. 1 also illustrates a direct (e.g., peer to peer) wired or wireless coupling between a computer device 102 and a communication device 104. This coupling may be a cable (wired) or a short range RF coupling such as, for instance, Bluetooth.

From a Quality of Service (QoS) standpoint, bonding multiple concurrent IP packet data streams representative of the same content over different communication links received into the same communications server 120 or computer device 102 can improve the quality and reliability of a communication session between those devices. For instance, communication sessions over 802.11 WiFi may offer the lowest cost alternative to the user and/or service provider while also offering relatively high quality of service (QoS). This is the most common configuration for many communication services like Skype™ or Google™ Voice. However, the computer device 102 executing an IP based communication application (e.g., Skype™, Google™ Voice) may encounter poor network conditions on a temporary basis. In such cases, the quality of the communication session, at least between the communications server 120 and the computer device 102 may degrade considerably. Pairing a communication device 104 that is also communicable with the communications server 120 with the computer device 102 adds a degree of redundancy that enables the computer device 102 to maintain the communication session at a satisfactory quality level.

For example, the computer device 102 may simultaneously send an IP packet data stream directly to the communications server 120 over its 802.11 connection (wired or wireless) and also to the paired communication device 104 over a peer to peer connection (e.g., Bluetooth or a cable). The communication device 104 may then relay the IP packet data stream to the communications server 120 over one or more IP data connections simultaneously. These IP connections may include an 802.11 WiFi connection, one or more cellular IP data connections via one or more mobile carrier networks 118, and one or more alternative IP data connections via one or more alternative wireless networks (not shown).

The basic approach is to maintain concurrent IP packet data streams between the communications server 120 and the computer device 102 such that when the primary IP packet data stream from the computer device 102 experiences connectivity issues that cause QoS to degrade, the affected packets may be replaced using one of the other concurrent IP packet data streams coming from the communications device 104. Depending on the direction of transmission, at the communications server 120 or at the computer device 102, the multiple received IP packet data streams may be re-assembled using a first packet to arrive within an allowed time slot methodology or a highest quality packet to arrive within an allowed time slot methodology. From the perspective outbound communication from the computer device 102, the computer device 102 sends an IP packet data stream (packets) to the communication device 104 over the short range peer to peer wireless (e.g., Bluetooth) or wired connection. The IP packets are then redirected to the communications server 120 using the radio(s) native to the communication device 104 as well as the networks to which the radios connect. Thus, with the assistance of the communication device 104, the integrity of the IP packet data stream between the computer device 102 and the communications server 120 may be maintained at quality levels that exceed a single communication link between computer device 102 and communications server 120. This multi-streaming/bonding approach works in both directions when the communication device 104 is situated in at least one path between the computer device 102 and the communications server 120. Specifically, the computer device 102 and the communications server 120 can send out multiple concurrent IP packet data streams. Similarly, the computer device 102 and the communications server 120 can receive multiple IP packet data streams and intelligently bond the received IP packet data streams into a single IP packet data stream.

In an example embodiment, the communications server 120 may be mediating a communication session between a computer device 102 and other communication device(s) 128. Typically, the computer device 102 is connected to LAN 114 via access point 112 and passes its IP packet data stream through those components to the communications server 120 via the Internet 122. The communications server 120 may coordinate and manage the communication session for the computer device 102 and a plurality of other communication devices 128. A communication device 104 may also be communicable with the communications server 120. In addition, the communication device 104 may further be directly communicable with the computer device 102 over a peer to peer wired or wireless connection. The peer to peer coupling between the computer device 102 and the communication device 104 set up the opportunity for those devices to work in tandem with the communications server 120 as will be described below. In addition, the computer device 102 and the communications server 120 may include IP multi-streaming (IPMS) logic adapted to send/receive multiple IP packet data streams and intelligently assemble received IP packet data streams into a single IP packet data stream.

Figure 2:
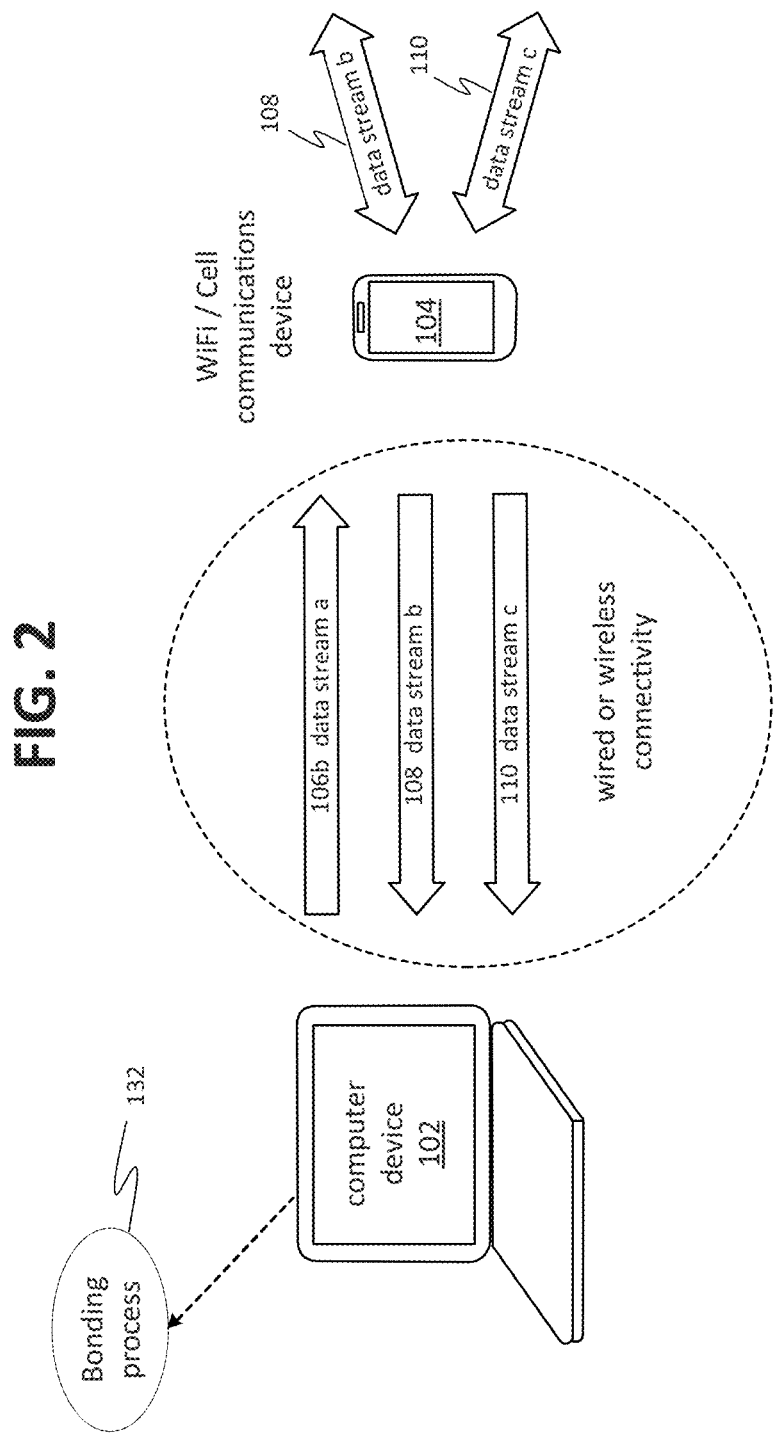
FIG. 2 highlights the communication between the primary and secondary devices in the example block diagram of FIG. 1.

FIG. 2 highlights the communication exchange between the primary and secondary devices in the example block diagram of FIG. 1. In this example the primary device is computer device 102 and the secondary device is communications device 104. As mentioned above, the computer device 102 may only be capable of connecting to the communications server 120 over a single IP network access point 112. The connection between computer device 102 and IP access point 112 may be wired (e.g., Ethernet) or wireless (e.g., WiFi 802.11). Either way, the computer may only be capable of sending a single IP packet data stream to the communications server 120. In FIG. 1, this single IP packet data stream is denoted as data stream a 106a. Data stream a 106a represents the content of a communication session between the computer device 102 and the communications server 120.

Computer device 102 may also be communicatively coupled with communication device 104 such that computer device 102 may simultaneously send a copy of data stream a noted as 106b to communication device 104. Data stream a is denoted as 106b to indicate that it is being sent to a different destination over a different transmission mechanism. Communication device 104 may include multiple radios communicable with multiple IP networks. For instance, a communication device such as a smartphone may have both a cellular radio and an 802.11 WiFi radio each capable of sending and receiving IP data packets over different networks, a mobile carrier network 118 and a LAN network 114 before converging on the communications server 120 over Internet 122. Similarly, the communications device 104 may receive multiple IP packet data streams 108, 110 from communications server 120 and relay same to computer device 102. On the receive side, computer 102 may further include software denoted as a bonding process 132 capable of aggregating and organizing the multiple concurrent received IP packet data streams—106a directly from the communications server 120 and 108, 110 from communication device 104—into a single bonded IP packet data stream for output to a user of computer device 102. The bonding process 132 may be first packet to arrive based or highest quality packet to arrive within a given time slot based. Either way, the intelligent bonding of multiple concurrent IP packet data streams decreases the odds that a packet is dropped due to jitter, latency, loss, etc. since the same packet would have to be dropped from all of the concurrently received IP packet data streams. So long as each packet arrives on at least one of the multiple IP packet data streams, the bonded IP packet data stream will remain intact. Even if there is not 100% packet reception, there is a higher percentage of packet reception under this multi-streaming/bonding approach than without.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
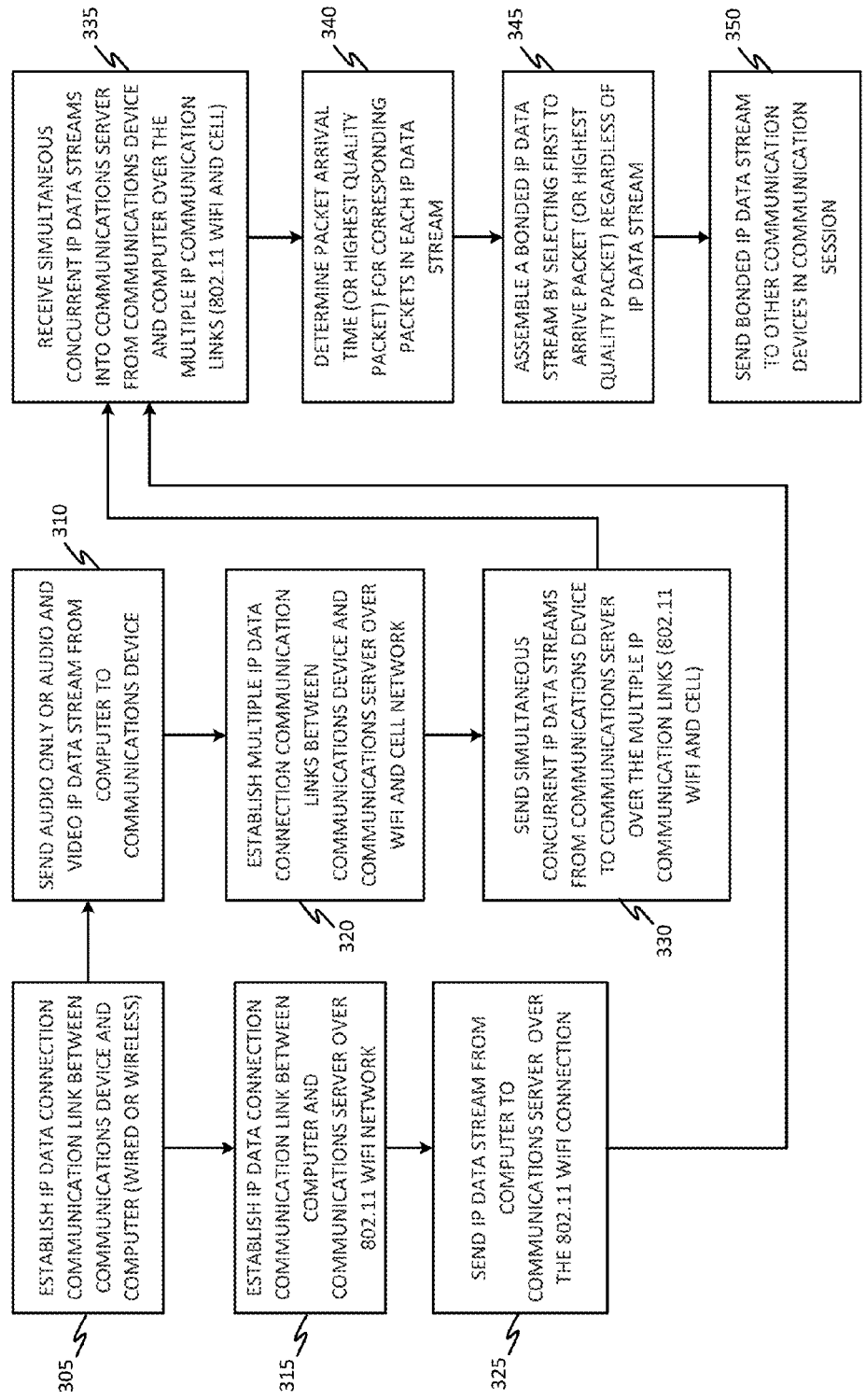
FIG. 3 illustrates an example logic flow diagram describing communication from an endpoint with the assistance of a mobile device to a communications server according to an embodiment of the invention.

FIG. 3 illustrates an example logic flow diagram 300 according to an embodiment of the invention. FIG. 3 describes the send side processing and logic flow from a computer device 102 to the communications server 120 for a given communication session. In this embodiment, the multiple IP packet data streams 106a, 108, 110 flow to communications server 120 from both a computer device 102 and a communications device 104. The computer device 102 and a communications device 104 work in tandem to present the communications server 120 with redundant concurrent IP packet data streams 106a, 108, 110. The initial IP packet data stream 106a originates in the computer device 102 and is copied to the communications device 104 so that both redundant versions may be sent to the communications server 120 over multiple IP data channels.

In another embodiment, the packets may be intentionally encoded differently for certain streams. For example, a cellular IP data stream may be encoded with less (but still a sufficient amount of) data than a WiFi IP data stream because it may cost less to send less data over cellular than WiFi. Thus, a hypothetical 500 byte data packet sent over WiFi may be the highest quality packet but a corresponding 180 byte packet sent over cellular data may still contain enough information for the application (e.g., VoIP) to function properly. Sending 180 bytes rather than 500 bytes represents a cost savings of 64% on the cellular IP data charges. It should be noted that the packet with less data still corresponds in time with the packet having more data. That is, they will each fill the same time slot in the corresponding IP data streams.

In block 305, the computer device 102 establishes a connection with the communications device 104 capable of exchanging IP packet data. The connection may be wired such as, for instance, a USB cable between the devices. The connection may also be wireless such as, for instance, a Bluetooth connection or an 802.11ad connection. Other short range wireless protocols may also be used for this connection including other 802.11 WiFi variants.

In block 310, the computer device 102 may send an IP packet data stream 106b to the communications device 104 over the established data connection from block 305. The IP packet data stream 106b may include data, voice, and/or video packets. The computer device 102 may also establish a connection with the communications device 104 capable of exchanging IP packet data at block 315. This connection may be over a cable (e.g., Ethernet) connected to a router/modem or via 802.11 WiFi with a network access point 112 having router/modem capabilities. At this point the computer device 102 may have established two (2) separate connections to two (2) different destinations, each connection capable of sending and receiving one or more IP packet data streams 106. Blocks 305, 310, and 315 assume that computer device 102 can execute a software application capable of creating an IP packet data stream 106. One example of an IP packet data stream 106 may be a voice communication session using Voice-over Internet Protocol (VoIP) utilizing one or more known audio codecs. Another example of an IP packet data stream 106 may be a video communication session utilizing one or more known video codecs. The remainder of the description of FIG. 3 assumes a communication session (video or voice) between the computer device 102 and one or more other communication devices 128 mediated by a cloud based communications server 120 therebetween. Thus, the IP packet data stream 106 representative of the communication session is sent from the computer device 102 to the communications device 104 as IP packet data stream 106b (block 310) and simultaneously sent from the computer device 102 to the communications server 120 as IP packet data stream 106a (block 315).

In block 320, the communications device 104 may initiate and establish multiple IP data connections with the communications server 112. For example, the communications device 104 may have a first IP data connection with the communications server 112 via 802.11 WiFi connectivity to access point 112 that in turn has connectivity to the communications server 120 via a local area network 114 coupled with the Internet 122. In addition, the communications device 104 may have a second IP data connection with the communications server 120 via a cellular IP data connection with a basestation 116 within a mobile or cellular network 118 that is connected to the Internet 122. Other IP data connections between the communications device 104 and the communications server 120 may exist over other cellular networks (not shown) or over an alternative wireless network (not shown) coupled with the Internet 122.

At block 325, the computer device 102 may send the IP packet data stream 106a indicative of the communication session to the communication server 120 using the connection established at block 315. Concurrently at block 330, the communications device 104 may send the IP packet data stream 108, 110 indicative of the communication session to the communication server 120 using the connections established at block 320. That is, the communications device 104 may send the IP packet data stream 106b received from the computer device 102 over two (2) or more communication links destined for the communications server 120.

At block 335, the communications server 120 may receive simultaneous concurrent IP packet data streams 106a, 108, 110 from the computer 102 and the communication device 104 over the IP data connections established in blocks 315 and 320. Each of the IP packet data streams 106a, 108, 110 may be representative of the same content but unique in the path to the communications server 120. In one embodiment, the content of the IP packet data streams 106a, 108, 110 may be, for instance, encoded as a VoIP Real-time Transport Protocol (RTP) data stream.

At block 340, the communications server 120 may determine a packet arrival time for corresponding packets in each of the IP packet data streams 106a, 108, 110. For example, it may be determined the first packet from IP packet data stream 106a (e.g., from the computer device 102) may arrive ahead of the first packets from IP packet data streams 108, 110 (e.g., from the 802.11 WiFi and cellular connections of the communication device 104). The second packet from IP packet data stream 110 (e.g., from the cellular connection of the communication device 104) may arrive ahead of the second packets from IP packet data streams 106a, 108 (i.e., from the 802.11 WiFi connections of computer device 102 and communication device 104). The same determination may be made for each subsequent packet that arrives at the communications server 120.

At block 345, the communications server 120 may assemble a bonded packet data stream 126 using the first to arrive packet from each of the IP packet data streams 106a, 108, 110. For example, packet 1 in the assembled IP packet data stream 126 may be from the 802.11 WiFi IP packet data stream 106a while packet 2 may be from the cellular IP packet data stream 110. Packet 3 may be from the 802.11 WiFi IP packet data stream 108 of the communication device 104 while packet 4 may be from the 802.11 WiFi IP packet data stream 106a. The resulting assembled IP packet data stream 126 may be a combination of the multiple IP packet data streams 106a, 108, 110 using the first to arrive of corresponding packets from the IP packet data streams 106a, 108, 110. The assembled IP packet data stream 126 thus represents a more stable and reliable overall VoIP RTP stream for a telephone call since it is assembled or bonded from, in this example, among three separate IP packet data streams 106a, 108, 110.

At block 350, the communications server 120 may then send the bonded IP packet data stream 126 to one or more destination communication devices 128 as per the constructs of the communication session. Thus, the other communication devices 128 receive the benefit of a more reliable IP packet data stream 126 on the inbound side since the communications server 120 was able to assemble the bonded IP packet data stream 126 from among three (3) distinct IP packet data streams 106a, 108, 110 containing content representative of, for instance, a voice communication it received from the computer device 102 and the communication device 104 working in tandem.

Figure 4:
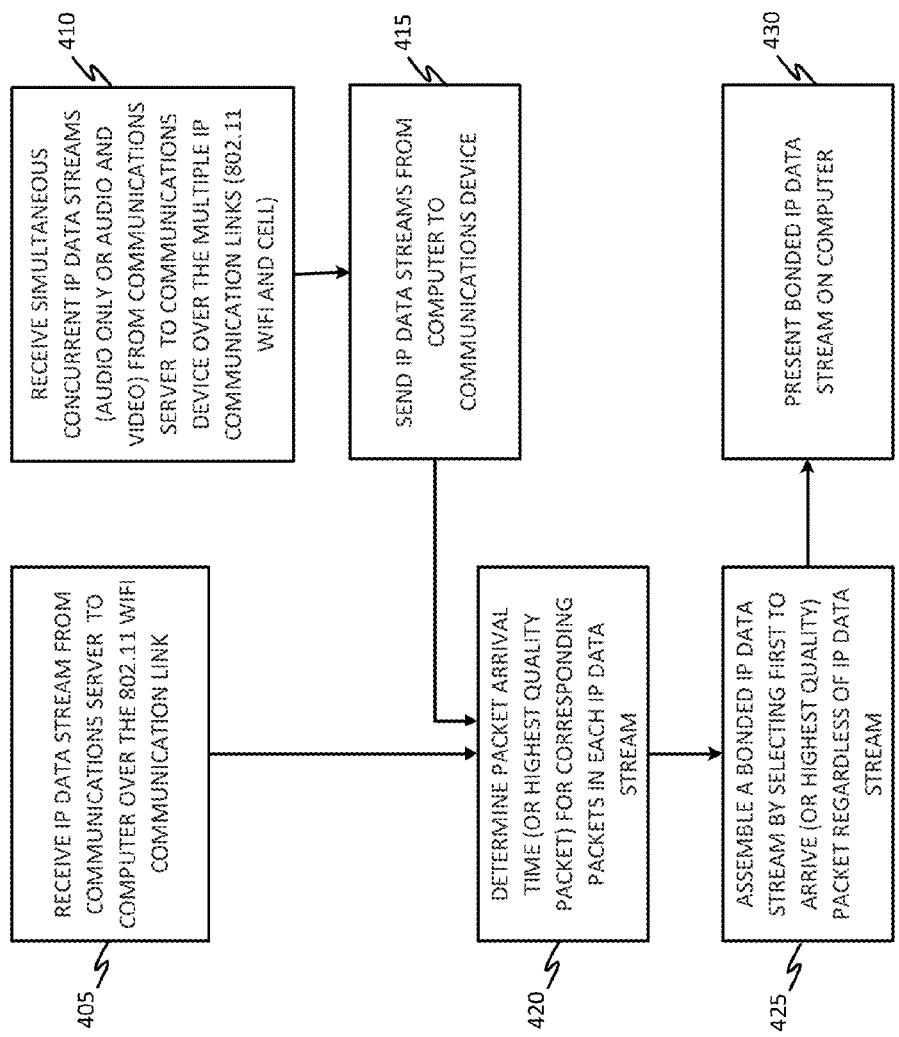
FIG. 4 illustrates another example logic flow diagram describing communication from the communications server to the endpoint with the assistance of a mobile device according to an embodiment of the invention.

FIG. 4 illustrates another example logic flow diagram 400 according to an embodiment of the invention. FIG. 4 describes the receive side processing and logic flow of a computer device 102 receiving IP packet data streams 106a, 108, 110 from the communications server 120 and the communication device 104 for a given communication session. In this embodiment, the flow of communication runs from the communications server 120 to the computer 102. The flow of communication also runs from the communications server 120 to the communication device 104 then into the computer device 102.

In block 405, the computer device 102 may receive a return IP packet data stream 106a from communications server 120 over the communication link established in block 315 of FIG. 3. This IP packet data stream 106a may be duplicative of the IP packet data stream 130 that communications server 120 received from an other communication device 128 that is party to the communication session. In a concurrent process represented by block 410, communications server 120 may send and communication device 104 may receive multiple IP packet data streams 108, 110 over different networks 114, 118 using the communication links established in block 320 of FIG. 3. In block 415, the communication device 104 may then repackage and relay the IP packet data streams 108, 110 to the computer device 102 using the communication link established in block 305 of FIG. 3. Each of the IP packet data streams 106a, 108, 110 may be representative of the content in IP packet data stream 126 received into the communications server 120 from the other communication device(s) 128 but unique in the path from the communications server 120 to the computer device 102.

In block 420, computer device 102 may determine the first to arrive packet within each time slot for all the received IP packet data streams 106a, 108, 110. In an alternative embodiment, computer device 102 may determine the highest quality to arrive packet within each time slot for all the received IP packet data streams 106a, 108, 110. In block 425, computer server 102 may assemble a bonded IP packet data stream from among the received IP packet data streams 106a, 108, 110 using the first packet to arrive approach or the highest quality packet to arrive approach. Computer device 102 may then present the bonded IP packet data stream to the user in block 430.

Figure 5:
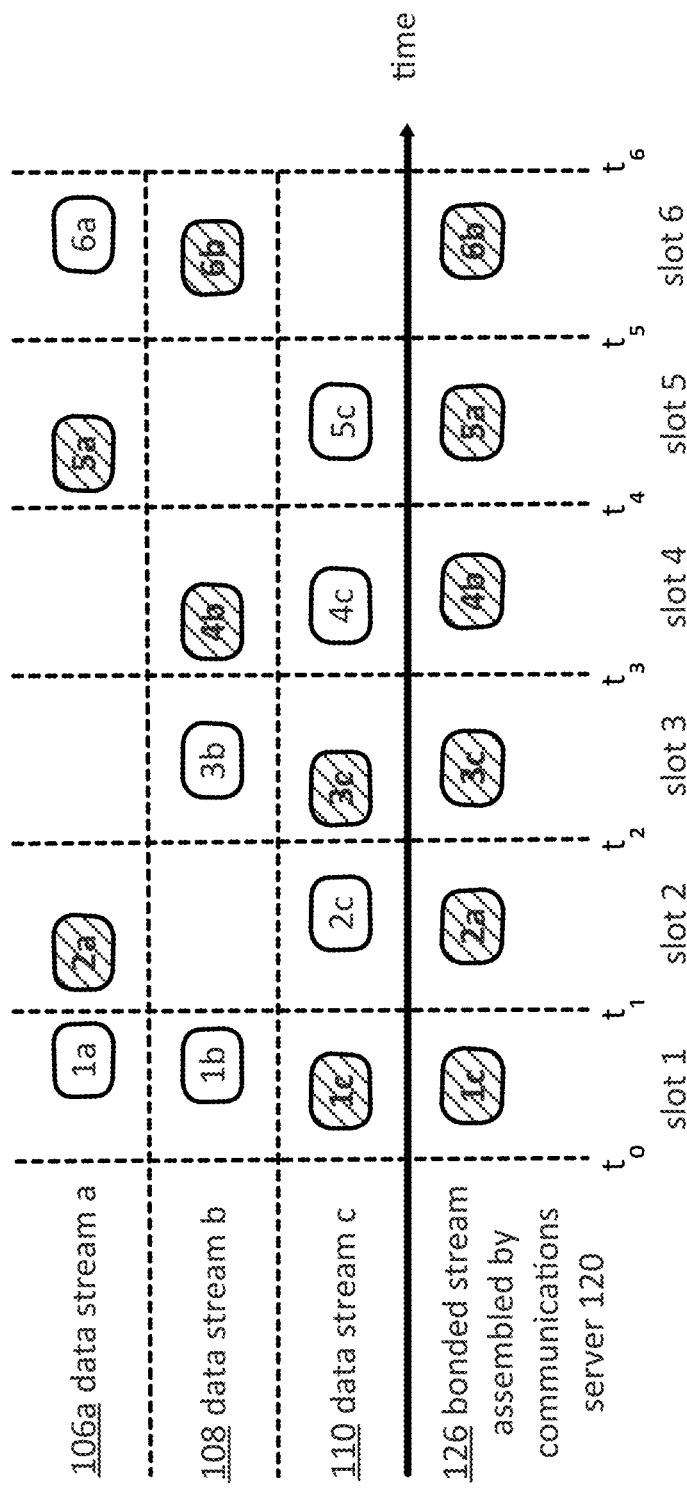
FIG. 5 illustrates a bonded IP stream for a plurality of IP packet data streams based on first packet to arrive according to an embodiment of the invention.

FIG. 5 illustrates a bonded IP packet data stream 126 created by the communications server 120 for a plurality of IP packet data streams 106a, 108, 110 based on the first packet to arrive within a given time slot approach according to an embodiment of the invention. In this example, there are three IP packet data streams 106a, 108, 110 labeled a, b, and c respectively.

As described above with respect to FIGS. 3-4, the three IP packet data streams 106a, 108, 110 arrive into the communications server 120 via separate communication links and/or separate devices. The original IP packet data stream 106a may be a representation of voice from a communication session emanating from the computer device 102. This IP packet data stream 106a may then be sent to two different destinations concurrently. The first destination may be the communications server 120 over an Ethernet or 802.11 WiFi communication link while the second destination may be to a communication device 104 situated in relatively close proximity to the computer device 102 over a wired or wireless (e.g., Bluetooth, 802.11 ad) communication link. The communication device 104 may then relay the IP packet data stream 106a concurrently to the communications server 120 over multiple communication links (e.g., 802.11 WiFi and/or cellular IP data). The IP packet data streams between the communication device 104 and the communications server 120 may be re-labeled as 108 (802.11 WiFi) and 110 (cellular IP data) depending on the communication link used.

The communications server 120 and the computer device 102 may be equipped to send and receive multiple concurrent IP packet data streams 106a, 108, 110 as well as merge the multiple IP packet data streams 106a, 108, 110 into a single bonded IP packet data stream. From the perspective of the computer device 102, the uplink direction may be characterized as an IP packet data stream flowing from the computer device 102 to the communications server 120 while the downlink direction may be characterized as an IP packet data stream flowing to the computer device 102 from the communications server 120. The techniques described herein may also apply to the uplink only, the downlink only, or both uplink and downlink. For example, the network conditions for uplink may be more problematic than downlink necessitating a multi-stream approach for the uplink but not the downlink. The same logic may be applied when the downlink is more problematic than the uplink.

Each of the IP packet data streams a, b, and c may be traversing different networks between the computer device 102 and the communications server 120. The IP packet data streams 106a, 108, 110 have been synchronized to be concurrent with one another. In this example, the IP packet data streams 106a, 108, 110 may be characterized as Real-time Transport Protocol (RTP) audio streams representative of VoIP communications. The data streams may be referred to as RTP-a, RTP-b, and RTP-c. Thus, when the computer device 102 or the communications server 120 encodes a packet for each time slot of a packet data stream, instead of sending the packet to a single network interface, it sends the exact same packet to all of the network interfaces simultaneously resulting in multiple concurrent IP packet data streams 106a, 108, 110 between the computer device 102 and the communications server 120. In these embodiments, a communication device 104 is also used to assist in the multi-streaming approach since the computer device 102 may not be equipped to access to an IP cellular data network interface. Thus, the communication device 104 may be responsible for receiving a single IP packet data stream from the computer device 102 and relaying it to the communications server 120 as multiple IP packet data streams over multiple communication links. Conversely, the communication device 104 may receive multiple IP packet data streams over multiple communication links from the communications server 120 and be responsible for relaying those IP packet data streams to computer device 102.

In another embodiment, the packets may be intentionally encoded differently for certain streams. For example, a cellular IP packet data stream may be encoded with less (but still a sufficient amount of) data than an Ethernet or 802.11 WiFi IP packet data stream because it may cost less to send less data over cellular than Ethernet or 802.11 WiFi. Thus, a hypothetical 500 byte data packet sent over Ethernet or 802.11 WiFi may be the highest quality packet but a corresponding 180 byte packet sent over cellular data may still contain enough information for the application (e.g., VoIP) to function properly. Sending 180 bytes rather than 500 bytes represents a cost savings of 64% on the cellular data charges. It should be noted that the packet with less data still corresponds in time with the packet having more data. That is, they will each fill the same time slot in the corresponding IP packet data streams.

Further by way of example, IP packet data stream 106a may be traversing an Ethernet or 802.11 WiFi network 114, IP packet data stream 108 may be traversing an 802.11 WiFi network 114, and IP packet data stream 110 may be traversing an IP cellular data network 118. Each of the IP packet data streams 106a, 108, 110 may be representative of the same content and synchronized in time but unique in the path taken between to the communications server 120. The timing diagram of FIG. 5 provides the status of the first six packets for each IP packet data stream on the receiving end within the communications server 120. FIG. 5 indicates that packet 1 within slot 1 for each of IP packet data streams 106a, 108, 110 was received and that packet 1c (cross-hatched for illustration) from the IP packet data stream 110 was received slightly ahead of packets 1a and 1b from IP packet data streams 106a and 108 respectively. Thus, in the resulting bonded IP packet data stream 126, packet 1c is the first packet. Packets 2a and 2c from IP packet data streams 106a and 110 respectively were received in time slot 2. In this time slot, packet 2b from IP packet data stream 108 was not received for some reason perhaps due to network connectivity issues such as jitter, latency or packet loss. Packet 2a arrived slightly ahead of packet 2c. Thus, packet 2a is the second packet in the bonded IP packet data stream 126. Similarly, packet 3c is the third packet in the bonded IP packet data stream 126 as it beat out packet 3b while packet 3a never arrived in time slot 3. Packet 4b is the fourth packet of the bonded IP packet data stream 126 in time slot 4. Packet 5a is the fifth packet of the bonded IP packet data stream 126 in time slot 5. Packet 6b is the sixth packet of the bonded IP packet data stream 126 in time slot 6.

The resulting bonded IP packet data stream 126 reads as follows: 1c-2a-3c-4b-5a-6b. In this example, two packets from each of IP packet data streams 106a, 108, 110 were combined, based on arrival time, to create the bonded IP packet data stream 126. The example illustrates how multiple IP packet data streams 106a, 108, 110 may be utilized to create the best possible QoS experience for the user. Had there only been one IP packet data stream, the QoS would have been lower. For instance, both IP packet data stream 106a and IP packet data stream 108 dropped two packets from their streams while IP packet data stream 110 still dropped one packet from its stream. In addition, each of the IP packet data streams 106a, 108, 110 experienced some latency for at least one packet in their stream. However, the bonded IP packet data stream 126 experienced no packet loss and no latency.

Overall QoS (e.g., call quality) may be improved based on known or expected network characteristics. For instance, WiFi networks typically exhibit very low latency and jitter characteristics but may become unreliable (e.g., dropping packets) as the hybrid mobile device moves further away from its WiFi access point. The cellular IP data networks may not be as good as WiFi with respect to jitter and latency but they tend to be more reliable and do not drop as many packets. By combining these separate IP packet data streams, one can achieve a higher overall QoS than either of the IP packet data streams separately. Moreover, if the WiFi IP packet data stream is losing its reliability as a result of moving away from an access point and is finally lost completely, there has been a graceful, non jarring natural handoff from the WiFi network to the cellular data network.

Figure 6:
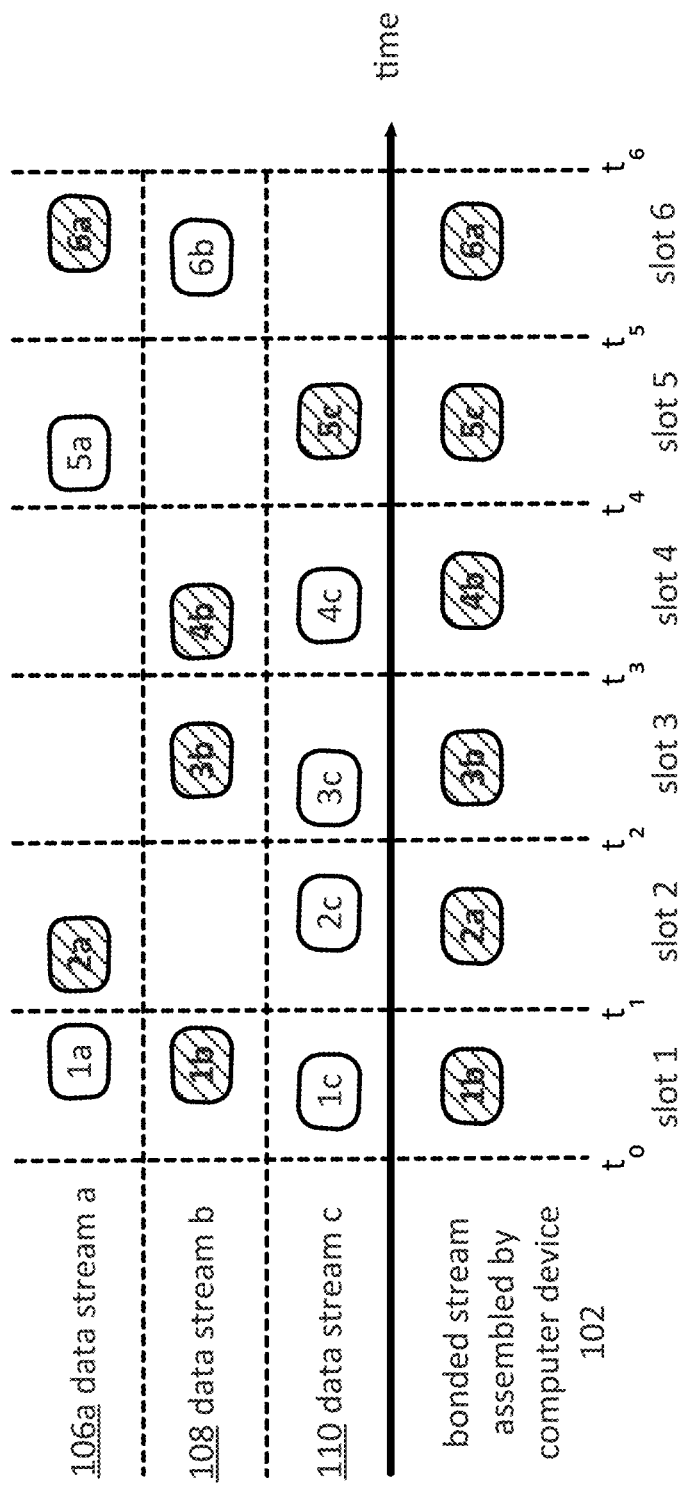
FIG. 6 illustrates a bonded IP stream for a plurality of IP packet data streams based on packet quality according to an embodiment of the invention.

FIG. 6 illustrates a bonded IP packet data stream generated on the computer device 102 for a plurality of IP packet data streams 106a, 108, 110 according to another embodiment of the invention. In this embodiment, the bonded IP packet data stream is based on packet quality. Thus, the IP packet data stream assembly policy may be more quality oriented as opposed to first to arrive oriented. For instance, the policy may evaluate packets in corresponding time slots from each received IP packet data stream 106a, 108, 110 to determine which IP packet data stream 106a, 108, 110 provided the highest quality packet. In this example, the bonded IP packet data stream may be comprised of the following sequence of packets 1b, 2a, 3b, 4b, 5c, and 6a. Each of these packets is cross-hatched for illustrative purposes in the original streams to indicate that it is the highest quality packet for a given time slot. Moreover, only packets 2a and 4b were the first to arrive within their respective time slots indicating that the policy determining the composition of the bonded IP packet data stream places quality of the arrived packet over time of arrival.

The quality of a packet may be determined by the amount of information it contains. If two corresponding packets are encoded using identical methods (e.g., codec, codec settings, input audio data, etc), one can assume that the packet that is larger will contain more information, and therefore provide a higher quality audio for the given time slot.

As a matter of practice, the non-cellular IP data stream can always being sent at "100%" quality. The quality of the cellular IP packet data stream may be varied by encoding partial information about the time slot. For example, high-frequency audio may be discarded at the transmitter side if it is expected that the packet will not be required at the receiver side. Even if the packet is needed due to all other corresponding packets for that time slot having been dropped, the quality is still sufficient to provide a satisfactory experience (playback) to the user.

In this scheme, the quality of the cellular IP packet data stream can scale with the expected utility of that IP packet data stream. If the cellular IP packet data stream is only intended to fix "gaps" in the WiFi stream, it can be of lower quality—and can be considered more of an error-correction scheme than full redundancy. This has a different effect than sending only 33% of total packets to save costs because having a packet that has 33% of the audio information may be better than only having 33% of packets.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method comprising:
   in a computer device communicable with a communications server and an intermediate communication device, the communications server situated in an Internet Protocol (IP) based packet data network:
      receiving multiple concurrent IP packet data streams each IP packet data stream representative of the same content received over corresponding multiple communication links, wherein an original fully encoded IP packet data stream comes from the communications server and at least one partially encoded IP packet data stream representative of the original IP packet data stream traverses a communication link through the intermediate communication device before arriving at the computer device, the packets comprising the partially encoded IP packet data stream containing less information than the packets comprising the fully encoded IP packet data stream;
      determining a highest quality packet in each time slot from among corresponding time slots of the multiple concurrent IP packet data streams, the highest quality packet being the one containing the most information; and
      creating a bonded IP packet data stream by selecting the highest quality packet for each time slot from among corresponding time slots of the multiple concurrent IP packet data streams.

2. The method of claim 1, the one or more communication links comprising one or more of an Ethernet communication link, an 802.11 WiFi network communication link, a cellular IP data communication link, an 802.16 WiMax network communication link, a wireless network communication link operating within a frequency range of 100 MHz and 700 MHz, a wireless network communication link operating within a frequency range of 3.5 GHz and 3.7 GHz, and a wireless network communication link operating at or above 35 GHz.

3. The method of claim 2, the cellular IP data communication link utilizing a protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

4. The method of claim 3, a portion of the communication link for the at least one IP packet data stream representative of the original IP packet data stream that traverses a communication link through the intermediate communication device before arriving at the computer device comprising a wireless communication link between the computer device and the intermediate communication device.

5. The method of claim 3, a portion of the communication link for the at least one IP packet data stream representative of the original IP packet data stream that traverses a communication link through the intermediate communication device before arriving at the computer device comprising a wired communication link between the computer device and the intermediate communication device.

6. The method of claim 3, the received multiple concurrent IP packet data streams comprising:
at least on IP packet data stream traversing an Ethernet communication link between the communications server and the computer device.

7. The method of claim 3, the received multiple concurrent IP packet data streams comprising:
at least on IP packet data stream traversing an 802.11 WiFi communication link between the communications server and the computer device.

8. The method of claim 3, the received multiple concurrent IP packet data streams comprising:
at least on IP packet data stream traversing an 802.11 WiFi communication link between the communications server and the intermediate communication device.

9. The method of claim 3, the received multiple concurrent IP packet data streams comprising:
at least on IP packet data stream traversing a cellular IP data communication link between the communications server and the intermediate communication device.

10. The method of claim 1, the IP packet data streams comprising a Voice-over Internet Protocol (VoIP) media stream.

11. The method of claim 10, the VoIP media stream comprised of Real-time Transport Protocol (RTP) packets.

12. A computer device communicable with a communications server and an intermediate communication device, the communications server situated in an Internet Protocol (IP) based packet data network, the computer device comprising:
a memory unit for storing code;
at least one processor for executing the stored code to:
receive multiple concurrent IP packet data streams each IP packet data stream representative of the same content received over corresponding multiple communication links, wherein an original fully encoded IP packet data stream comes from the communications server and at least one partially encoded IP packet data stream representative of the original IP packet data stream traverses a communication link through the intermediate communication device before arriving at the computer device, the packets comprising the partially encoded IP packet data stream containing less information than the packets comprising the fully encoded IP packet data stream;
determine a highest quality packet in each time slot from among corresponding time slots of the multiple concurrent IP packet data streams, the highest quality packet being the one containing the most information; and
create a bonded IP packet data stream by selecting the highest quality packet for each time slot from among corresponding time slots of the multiple concurrent IP packet data streams.

13. The computer device of claim 12, the one or more communication links comprising one or more of an Ethernet communication link, an 802.11 WiFi network communication link, a cellular IP data communication link, an 802.16 WiMax network communication link, a wireless network communication link operating within a frequency range of 100 MHz and 700 MHz, a wireless network communication link operating within a frequency range of 3.5 GHz and 3.7 GHz, and a wireless network communication link operating at or above 35 GHz.

14. The computer device of claim 13, the cellular IP data communication link utilizing a protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

15. The computer device of claim 14, a portion of the communication link for the at least one IP packet data stream representative of the original IP packet data stream that traverses a communication link through the intermediate communication device before arriving at the computer device comprising a wireless communication link between the computer device and the intermediate communication device.

16. The computer device of claim 14, a portion of the communication link for the at least one IP packet data stream representative of the original IP packet data stream that traverses a communication link through the intermediate communication device before arriving at the computer device comprising a wired communication link between the computer device and the intermediate communication device.

17. The computer device of claim 14, the received multiple concurrent IP packet data streams comprising:
at least on IP packet data stream traversing an Ethernet communication link between the communications server and the computer device.

18. The computer device of claim 14, the received multiple concurrent IP packet data streams comprising: at least on IP packet data stream traversing an 802.11 WiFi communication link between the communications server and the computer device.

19. The computer device of claim 14, the received multiple concurrent IP packet data streams comprising:

at least on IP packet data stream traversing an 802.11 WiFi communication link between the communications server and the intermediate communication device.

20. The computer device of claim 14, the received multiple concurrent IP packet data streams comprising:
at least on IP packet data stream traversing a cellular IP data communication link between the communications server and the intermediate communication device.

21. The computer device of claim 12, the IP packet data streams comprising a Voice-over Internet Protocol (VoIP) media stream.

22. The computer device of claim 21, the VoIP media stream comprised of Real-time Transport Protocol (RTP) packets.

* * * * *